United States Patent
Yoshii et al.

(10) Patent No.: US 11,597,181 B2
(45) Date of Patent: Mar. 7, 2023

(54) WAVELENGTH CONVERSION DEVICE AND METHOD OF MANUFACTURING WAVELENGTH CONVERSION DEVICE

(71) Applicant: Murata Manufacturing Co., Ltd., Nagaokakyo (JP)

(72) Inventors: Kentaro Yoshii, Nagaokakyo (JP); Hiroaki Kaida, Nagaokakyo (JP); Susumu Okazaki, Nagaokakyo (JP); Shigeaki Sugimura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 439 days.

(21) Appl. No.: 16/839,574

(22) Filed: Apr. 3, 2020

(65) Prior Publication Data
US 2020/0230913 A1    Jul. 23, 2020

Related U.S. Application Data

(63) Continuation of application No. PCT/JP2018/022958, filed on Jun. 15, 2018.

(30) Foreign Application Priority Data

Oct. 13, 2017   (JP) .............................. JP2017-199370

(51) Int. Cl.
  *B32B 7/02*    (2019.01)
  *B32B 3/30*    (2006.01)
  (Continued)

(52) U.S. Cl.
  CPC ................. *B32B 7/02* (2013.01); *B32B 3/30* (2013.01); *B32B 7/14* (2013.01); *B32B 37/1292* (2013.01);
  (Continued)

(58) Field of Classification Search
  CPC .... B32B 7/02; B32B 3/30; B32B 7/14; B32B 37/1292; B32B 37/18; B32B 2551/00;
  (Continued)

(56) References Cited

U.S. PATENT DOCUMENTS

2008/0174736 A1   7/2008  Huang et al.
2008/0231942 A1   9/2008  Huang et al.
(Continued)

FOREIGN PATENT DOCUMENTS

JP    2001210895 A  *  8/2001
JP    2001210895 A     8/2001
(Continued)

OTHER PUBLICATIONS

Ishizuki, Hideki et al., Quasi phase-matched quartz for intense-laser pumped wavelength conversion, Optics Express, Feb. 6, 2017, vol. 25 No. 3, pp. 2369-2376.
(Continued)

*Primary Examiner* — Patricia D Valenzuela
(74) *Attorney, Agent, or Firm* — ArentFox Schiff LLP

(57) ABSTRACT

A wavelength conversion device that includes a plurality of crystal layers adjacent to one another such that crystal-axis orientations thereof are alternately arranged, the plurality of crystal layers each including a first-thickness portion having a first thickness and a second-thickness portion having a second thickness smaller than the first thickness; and an adhesive layer in at least part of a gap between adjacent second-thickness portions of the plurality of crystal layers and with which the plurality of crystal layers are bonded to one another.

19 Claims, 20 Drawing Sheets

(51) Int. Cl.
*B32B 7/14* (2006.01)
*B32B 37/12* (2006.01)
*B32B 37/18* (2006.01)
*G02F 1/35* (2006.01)
*G02F 1/355* (2006.01)
*H01G 4/232* (2006.01)
*H01G 13/00* (2013.01)

(52) U.S. Cl.
CPC ............ *B32B 37/18* (2013.01); *G02F 1/3548* (2021.01); *B32B 2551/00* (2013.01); *G02F 1/353* (2013.01); *G02F 1/3558* (2013.01); *H01G 4/232* (2013.01); *H01G 13/006* (2013.01)

(58) Field of Classification Search
CPC ...... G02F 1/3548; G02F 1/3507; G02F 1/353; H01G 13/006; H01G 4/232
See application file for complete search history.

(56) References Cited

U.S. PATENT DOCUMENTS

2009/0028207 A1   1/2009  Huang et al.
2010/0033806 A1*  2/2010  Satoh .................... G02F 1/3558
                                                     117/1

FOREIGN PATENT DOCUMENTS

| JP | 2004239959 A | 8/2004 |
| JP | 2004279612 A | 10/2004 |
| JP | 2008233143 A | 10/2008 |
| JP | 2010185980 A | 8/2010 |

OTHER PUBLICATIONS

International Search Report Issued for PCT/JP2018/022958, dated Aug. 21, 2018.
Written Opinion of the International Searching Authority issued for PCT/JP2018/022958, dated Aug. 21, 2018.

* cited by examiner

WAVELENGTH CONVERSION DEVICE AND METHOD OF MANUFACTURING WAVELENGTH CONVERSION DEVICE

CROSS REFERENCE TO RELATED APPLICATIONS

The present application is a continuation of International application No. PCT/JP2018/022958, filed Jun. 15, 2018, which claims priority to Japanese Patent Application No. 2017-199370, filed Oct. 13, 2017, the entire contents of each of which are incorporated herein by reference.

FIELD OF THE INVENTION

The present invention relates to a wavelength conversion device and a method of manufacturing a wavelength conversion device.

BACKGROUND OF THE INVENTION

In fields of manufacturing or inspection of semiconductor devices, laser processing, 3D printers, and medical methods such as LASIK, lasers such as ArF excimer lasers and KrF excimer lasers are employed as light sources emitting vacuum ultraviolet light at a wavelength of 200 nm or shorter. Despite their high output, excimer lasers, which are gas lasers, exhibit low energy-conversion efficiency and require a complicated process of gas exchange. Moreover, since excimer lasers are used with toxic corrosive gas, safety needs to be ensured, which increases the maintenance cost. In addition, size reduction is difficult. Accordingly, there has been a demand for solid-state lasers, which do not require the use of gas, and are capable of generating laser light at a short wavelength corresponding to light generated by excimer lasers.

In response to such a demand, there is a proposal in which light at a long wavelength is generated by a solid-state laser and is converted into light at a short wavelength by a wavelength conversion device. In the wavelength conversion device, heat and stress are periodically applied to a crystal to artificially form a twinned structure in the crystal, whereby a polarization-inverted structure is obtained (see Patent Document 1, for example). Crystal is thermally and chemically stable, has a high damage threshold, and is transparent not only to light at a long wavelength but also to ultraviolet light, which has a short wavelength. Therefore, a wavelength conversion device made of crystal exhibits excellent optical characteristics with high durability and low transmission loss.

Patent Document 1: Japanese Unexamined Patent Application Publication No. 2004-279612

SUMMARY OF THE INVENTION

To artificially form a twinned structure in a crystal, a heavy load and high heat need to be applied to the crystal. In the known method, it is difficult to stably manufacture a wavelength conversion device made of crystal. The present invention has been conceived in view of such circumstances. An object of the present invention is to provide a wavelength conversion device that is easy to manufacture and a method of manufacturing the wavelength conversion device.

A wavelength conversion device according to an aspect of the present invention includes a plurality of crystal layers adjacent to one another such that crystal-axis orientations of the crystal layers are alternately arranged, the plurality of crystal layers each including a first-thickness portion having a first thickness and a second-thickness portion having a second thickness smaller than the first thickness; and an adhesive layer in at least part of a gap between adjacent second-thickness portions of the plurality of crystal layers and with which the plurality of crystal layers are bonded to one another.

A method of manufacturing a wavelength conversion device according to another aspect of the present invention includes providing a plurality of crystal layers each including a first-thickness portion having a first thickness, a second-thickness portion having a second thickness smaller than the first thickness, and a crystal-axis orientation; placing adhesive over at least part of the second-thickness portion of a first crystal layer of the plurality of crystal layers; placing a second crystal layer of the plurality of crystal layers adjacent the first crystal layer such that the respective first-thickness portions and the second-thickness portions of the first and second crystal layers are adjacent each other and the crystal-axis orientations of the first and second crystal layers are alternately arranged; and bonding the plurality of crystal layers to one another with the adhesive.

According to the present invention, a wavelength conversion device that is easy to manufacture and a method of manufacturing the wavelength conversion device can be provided.

DETAILED DESCRIPTION OF THE PREFERRED EMBODIMENTS

Figure 1:
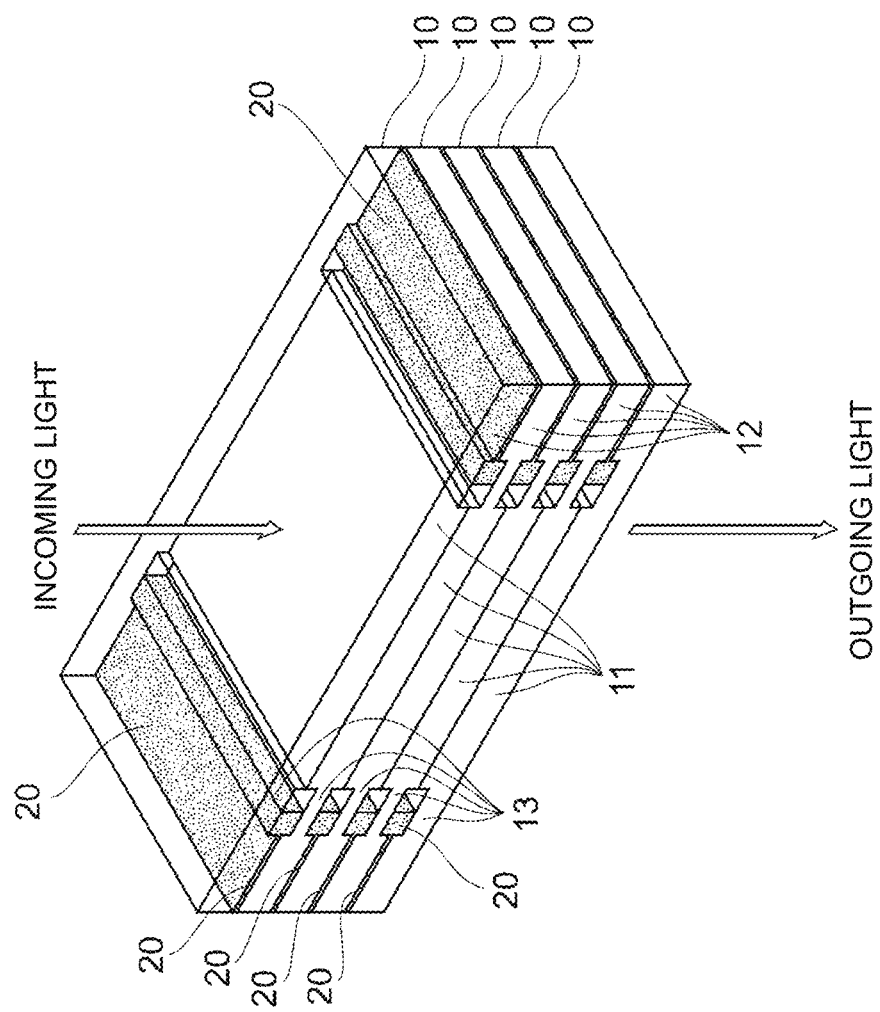
FIG. 1 is a schematic perspective view of a wavelength conversion device according to a first embodiment.

Embodiments of the present invention will now be described with reference to the drawings. In the following description of the drawings, the same or similar elements are denoted by the same or similar reference numerals. Note that the drawings are schematic. Therefore, specific dimensions and other factors should be verified by referring to the following description. Needless to say, the drawings are not necessarily to scale.

First Embodiment

As illustrated in FIG. 1, a wavelength conversion device according to a first embodiment includes a plurality of crystal layers 10 bonded to one another such that crystal-axis orientations thereof are alternately changed. The plurality of crystal layers 10 each include a first-thickness portion 11 having a first thickness, and a second-thickness portion 12 having a second thickness smaller than the first thickness. The wavelength conversion device further includes adhesive layers 20 each provided in at least part of a gap between adjacent ones of the second-thickness portions 12 of the plurality of crystal layers 10. The plurality of crystal layers 10 are bonded to one another with the adhesive layers 20.

Incoming light, which is subjected to wavelength conversion, is made to be incident on the surface of the first-thickness portion 11 of the uppermost one of the plurality of crystal layers 10. When the incoming light enters the plurality of crystal layers 10, second harmonic waves each having a wavelength that is half the wavelength of the incoming light are generated in the plurality of crystal layers 10. Since the crystal-axis orientations of the plurality of crystal layers 10 are periodically inverted, the phases of the second harmonic waves generated at different locations in the crystal layers 10 match or substantially match one another. Thus, a second harmonic wave having a desired intensity is emitted from the plurality of crystal layers 10. Note that the same applies to a case where the incoming light is made to be incident on the bottom surface of the first-thickness portion 11 of the lowermost crystal layer 10.

Figure 2:
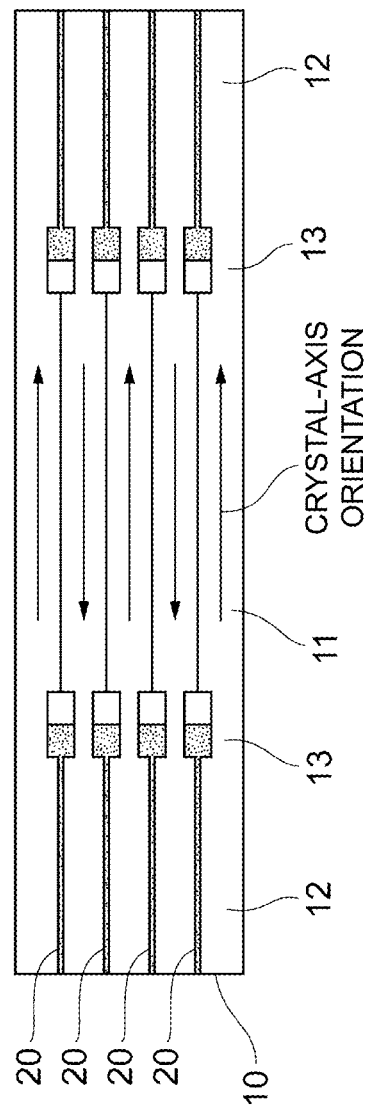
FIG. 2 is a schematic side view of the wavelength conversion device according to the first embodiment.

The plurality of crystal layers 10 are each made of quartz ($SiO_2$). While plurality of crystal layers 10 are each shown as having, for example, a rectangular top-view shape, the shape is not particularly limited thereto. As illustrated in FIG. 2, the plurality of crystal layers 10 are bonded to one another such that the crystal-axis orientations thereof are alternately inverted. The crystal axis is also referred to as polar axis. Herein, the situation where the crystal-axis orientations are alternately inverted preferably implies a situation where the crystal-axis orientations are alternately inverted by 180 degrees. However, the crystal-axis orientations do not necessarily need to be alternately inverted by 180 degrees and only need to be alternately inverted by an angle at which the second harmonic wave emitted from the wavelength conversion device has a desired intensity.

The first thickness of the first-thickness portions 11 is preferably a value with which the phases of the second harmonic waves match one another. However, the first thickness does not necessarily need to be a value with which the phases of the second harmonic waves completely match one another and only needs to be a value with which the second harmonic wave emitted from the wavelength conversion device has a desired intensity. As long as the second harmonic wave emitted from the wavelength conversion device has a desired intensity, the thicknesses of the first-thickness portions 11 of the plurality of crystal layers 10 may be either the same or different. As long as the second harmonic wave emitted from the wavelength conversion device has a desired intensity, the number of crystal layers 10 to be stacked is arbitrary. The number of crystal layers 10 may either be even or odd.

If any gap or any medium different from crystal is interposed between adjacent ones of the first-thickness portions of the plurality of crystal layers 10, the intensities of the incoming light and the second harmonic wave in a certain direction are reduced because of refraction, diffusion, or the like. Hence, the first-thickness portions 11 of the plurality of crystal layers 10 may be in direct contact with one another at least in the optical path of the second harmonic wave. The first-thickness portions 11 of the plurality of crystal layers 10 may be in direct contact with one another over the entirety thereof. To bring the first-thickness portions 11 into direct contact with one another, it is preferable that the adhesive layer 20 be absent between adjacent ones of the first-thickness portions 11 of the plurality of crystal layers 10.

The plurality of crystal layers 10 may each include the second-thickness portion 12 at one end of the first-thickness portion 11 or at each of the two ends of the first-thickness portion 11. Furthermore, the second-thickness portion 12 may be positioned at an end portion of each of the plurality of crystal layers 10. Either of the upper surface and the lower surface of the second-thickness portion 12 may be flush with the upper surface or the lower surface of the first-thickness portion 11. Alternatively, another configuration may be employed in which the upper surface of the second-thickness portion 12 and the upper surface of the first-thickness portion 11 are in different planes while the lower surface of the second-thickness portion 12 and the lower surface of the first-thickness portion 11 are in different planes.

The second-thickness portion 12 is thinner than the first-thickness portion 11. Therefore, when the plurality of crystal layers 10 are bonded to one another, a gap is produced between adjacent ones of the second-thickness portions 12. The adhesive layers 20 are each present in at least part of the gap between adjacent ones of the second-thickness portions 12, thereby fixing the plurality of crystal layers 10 to one another. If the adhesive layers 20 each have a thickness equal to the size of the gap between adjacent ones of the second-thickness portions 12, the first-thickness portions 11 are allowed to be in direct contact with one another.

The plurality of crystal layers 10 may each further include a third-thickness portion 13 having a third thickness smaller than the second thickness and provided between the first-thickness portion 11 and the second-thickness portion 12. Either of the upper surface and the lower surface of the third-thickness portion 13 may be flush with the upper surface or the lower surface of the first-thickness portion 11. Alternatively, another configuration may be employed in which the upper surface of the third-thickness portion 13 and the upper surface of the first-thickness portion 11 are in different planes while the lower surface of the third-thickness portion 13 and the lower surface of the first-thickness portion 11 are in different planes.

The plurality of crystal layers 10 may each have a groove defined by the first-thickness portion 11, the second-thickness portion 12, and the third-thickness portion 13, with the upper surface of the third-thickness portion 13 forming the bottom surface of the groove. Alternatively, the plurality of crystal layers 10 may each have a groove defined by the first-thickness portion 11, the second-thickness portion 12, and the third-thickness portion 13, with the bottom surface of the third-thickness portion 13 forming the upper surface of the groove.

The third-thickness portion 13 is thinner than the first-thickness portion 11. Therefore, when the plurality of crystal layers 10 are bonded to one another, a gap is produced between adjacent ones of the third-thickness portions 13. The adhesive layers 20 may each further extend over at least part of the third-thickness portion 13 of a corresponding one of the plurality of crystal layers 10. In such a case, the adhesive layers 20 may each be present in at least part of a gap between adjacent ones of the third-thickness portions 13, thereby fixing the plurality of crystal layers 10 to one another.

Now, a method of manufacturing the wavelength conversion device according to the first embodiment will be described.

Figure 3:
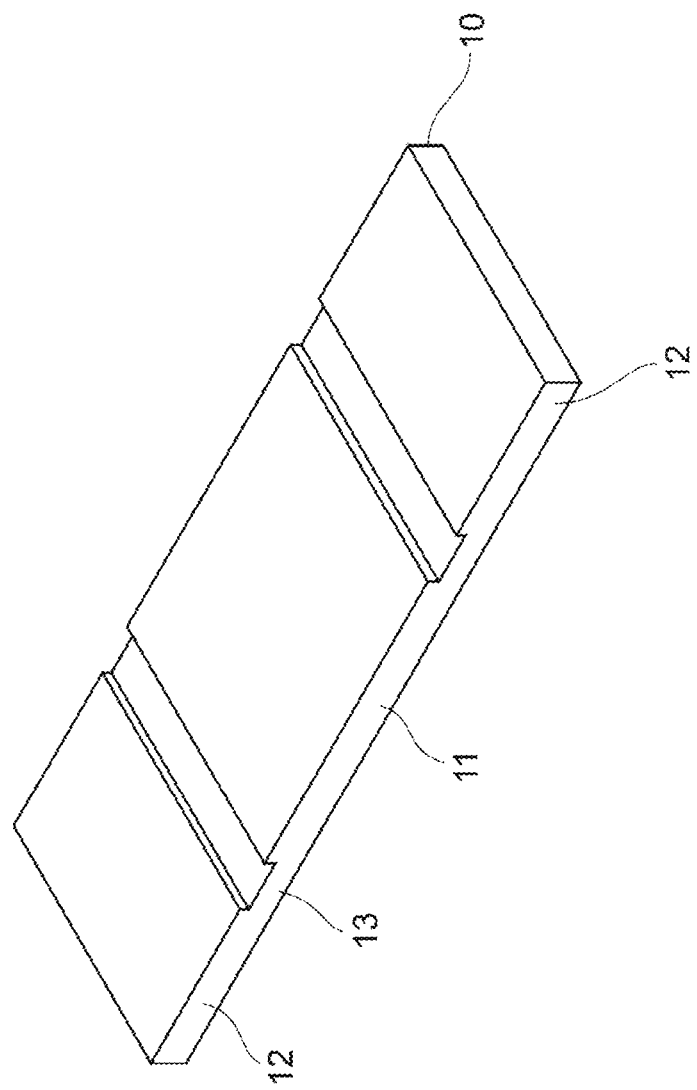
FIG. 3 is a schematic perspective view illustrating a method of manufacturing the wavelength conversion device according to the first embodiment.
Figure 4:
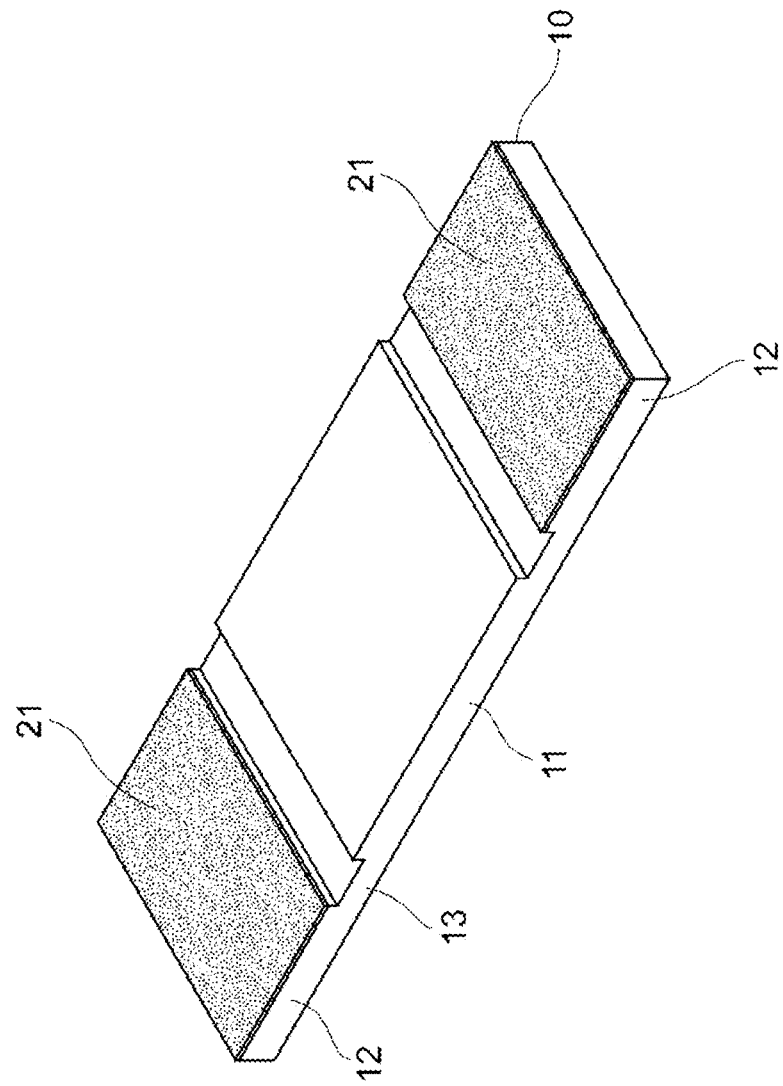
FIG. 4 is another schematic perspective view illustrating the method of manufacturing the wavelength conversion device according to the first embodiment.

As illustrated in FIG. 3, a first crystal layer 10 is prepared that includes second-thickness portions 12 at the two respective ends thereof, third-thickness portions 13 on the inner side of the respective second-thickness portions 12, and a first-thickness portion 11 between the third-thickness portions 13. As illustrated in FIG. 4, adhesive 21 is provided over part of or the entirety of each of the second-thickness portions 12 of the first crystal layer 10. The adhesive 21 is liquid, for example. The adhesive 21 may be any of ultraviolet (UV)-curable resin, thermosetting resin, and the like. The adhesive 21 may be either inorganic adhesive or an organic adhesive. Examples of inorganic adhesive include glass paste such as sodium silicate obtained by mixing silicon dioxide ($SiO_2$) and caustic soda (NaOH). Examples of organic adhesive include epoxy resin.

Figure 5:
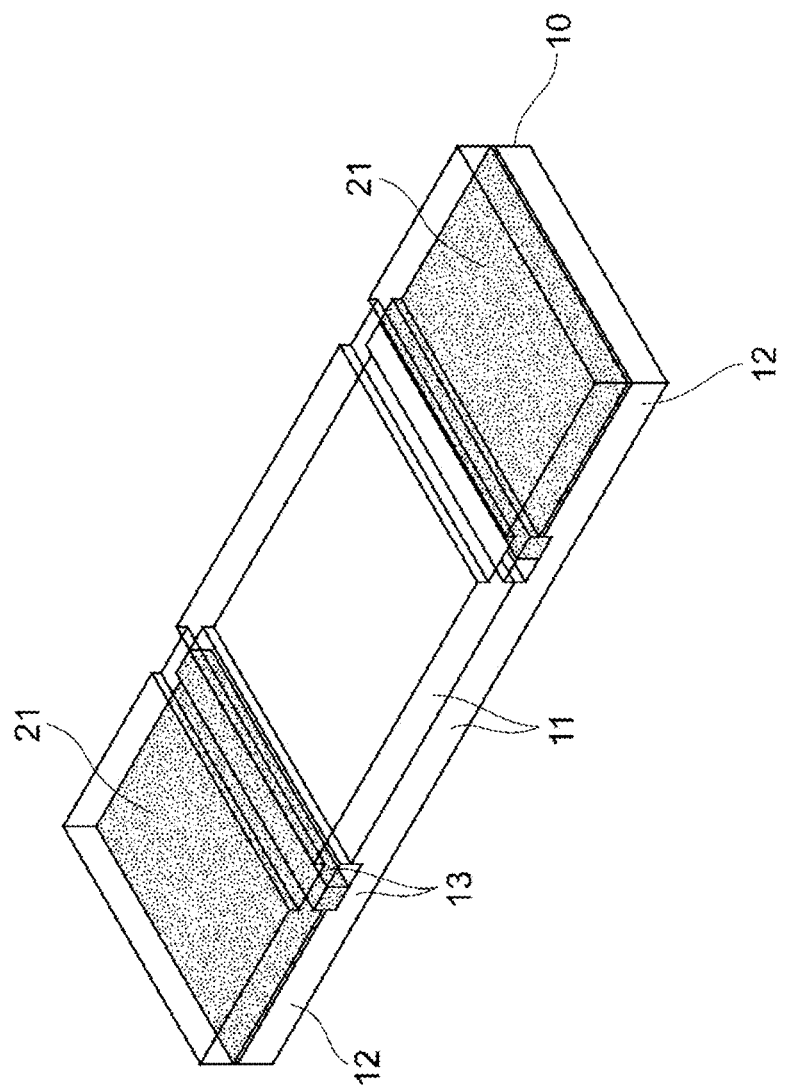
FIG. 5 is yet another schematic perspective view illustrating the method of manufacturing the wavelength conversion device according to the first embodiment.

As illustrated in FIG. 5, a second crystal layer 10 is placed on the first crystal layer 10 on which the adhesive 21 has been provided. The second crystal layer 10 has a different crystal-axis orientation from the first crystal layer 10. The second crystal layer 10 is placed such that the positions of the first-thickness portion 11, the second-thickness portions 12, and the third-thickness portions 13 thereof match the positions of the first-thickness portion 11, the second-thickness portions 12, and the third-thickness portions 13 of the first crystal layer, respectively. In this step, the adhesive 21 provided between the upper surface of each of the second-thickness portions 12 of the first crystal layer 10 and the lower surface of a corresponding one of the second-thickness portions 12 of the second crystal layer 10 is squeezed to spread into a space between the upper surface of a corresponding one of the third-thickness portions 13 of the first crystal layer 10 and the lower surface of a corresponding one of the third-thickness portions 13 of the second crystal layer 10. Since such a space having a certain volume is provided, the adhesive 21 is prevented from spreading into a space between the upper surface of the first-thickness portion 11 of the first crystal layer 10 and the lower surface of the first-thickness portion 11 of the second crystal layer 10. Therefore, the upper surface of the first-thickness portion 11 of the first crystal layer 10 and the lower surface of the first-thickness portion 11 of the second crystal layer 10 are allowed to be substantially or completely in direct contact with each other.

Figure 6:
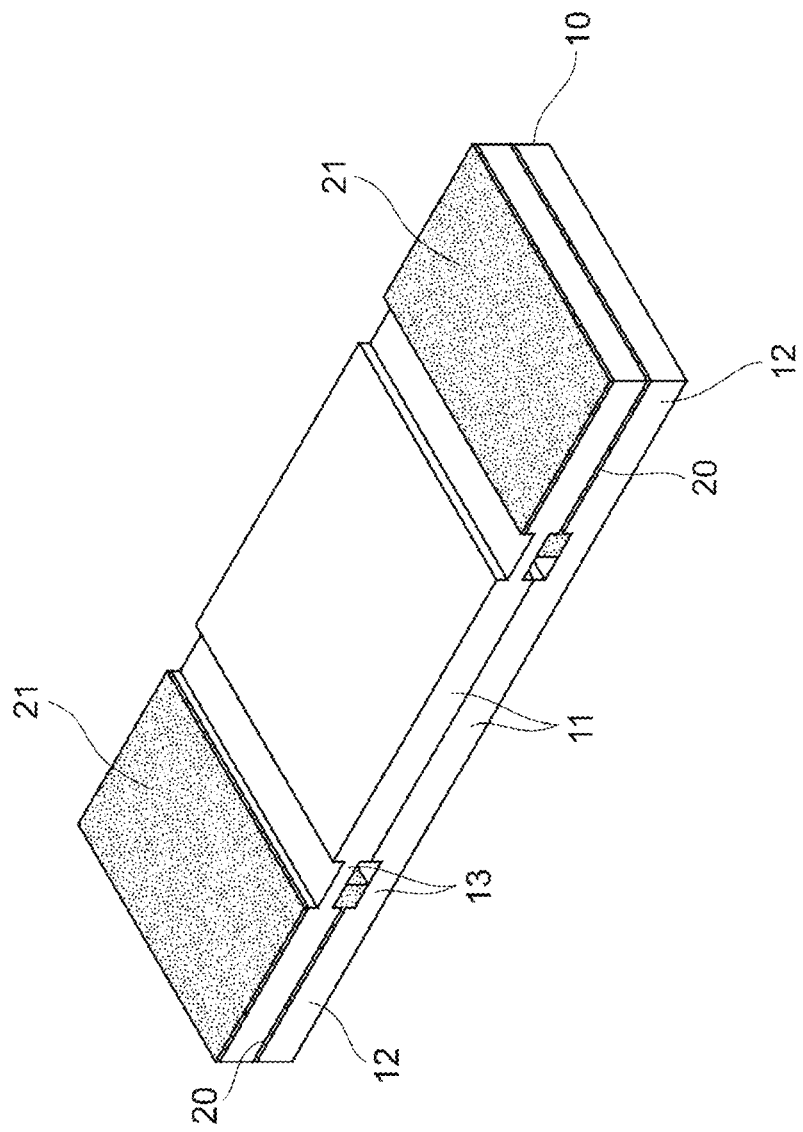
FIG. 6 is yet another schematic perspective view illustrating the method of manufacturing the wavelength conversion device according to the first embodiment.
Figure 7:
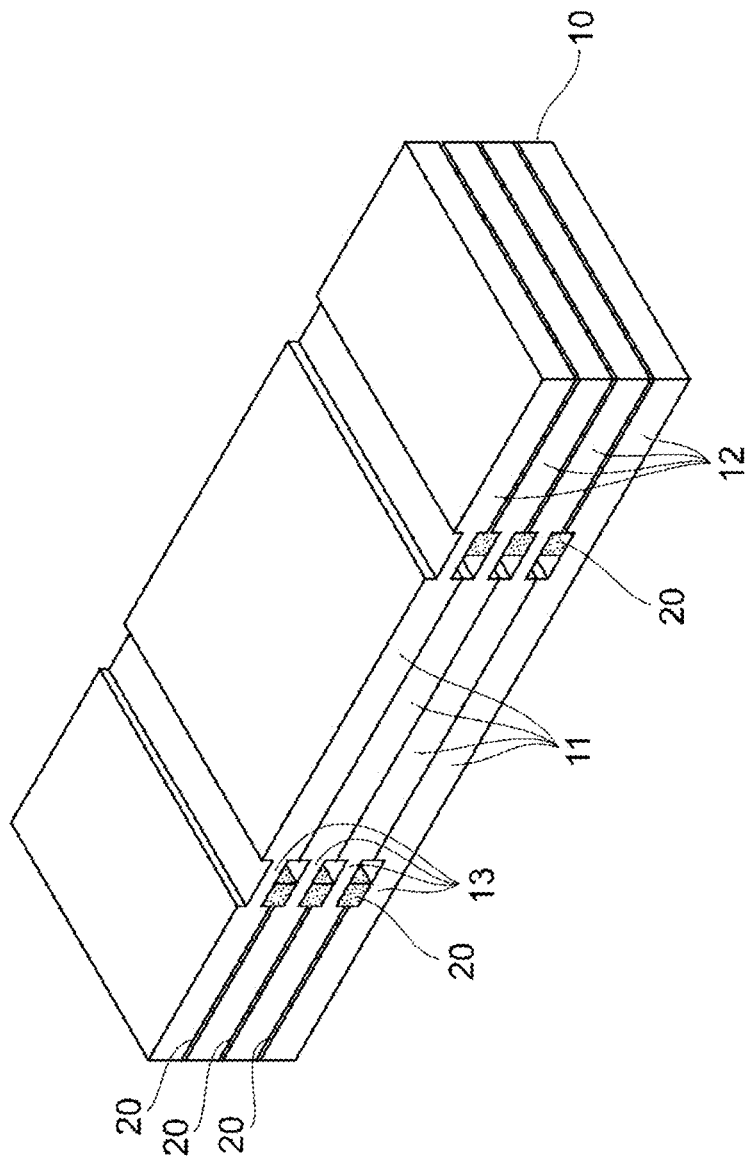
FIG. 7 is yet another schematic perspective view illustrating the method of manufacturing the wavelength conversion device according to the first embodiment.

Then, the adhesive 21 is cured, whereby the second crystal layer 10 is fixed to the first crystal layer 10. Subsequently, as illustrated in FIG. 6, adhesive 21 is provided over part of or the entirety of each of the second-thickness portions 12 of the second crystal layer 10. Then, as illustrated in FIG. 7, a third and subsequent crystal layers 10 are sequentially bonded to the preceding crystal layer 10 such that the crystal-axis orientations thereof are alternately changed. As described above, the number of crystal layers 10 to be stacked is arbitrary, as long as the second harmonic wave to be emitted from the wavelength conversion device thus manufactured has a desired intensity.

Figure 8:
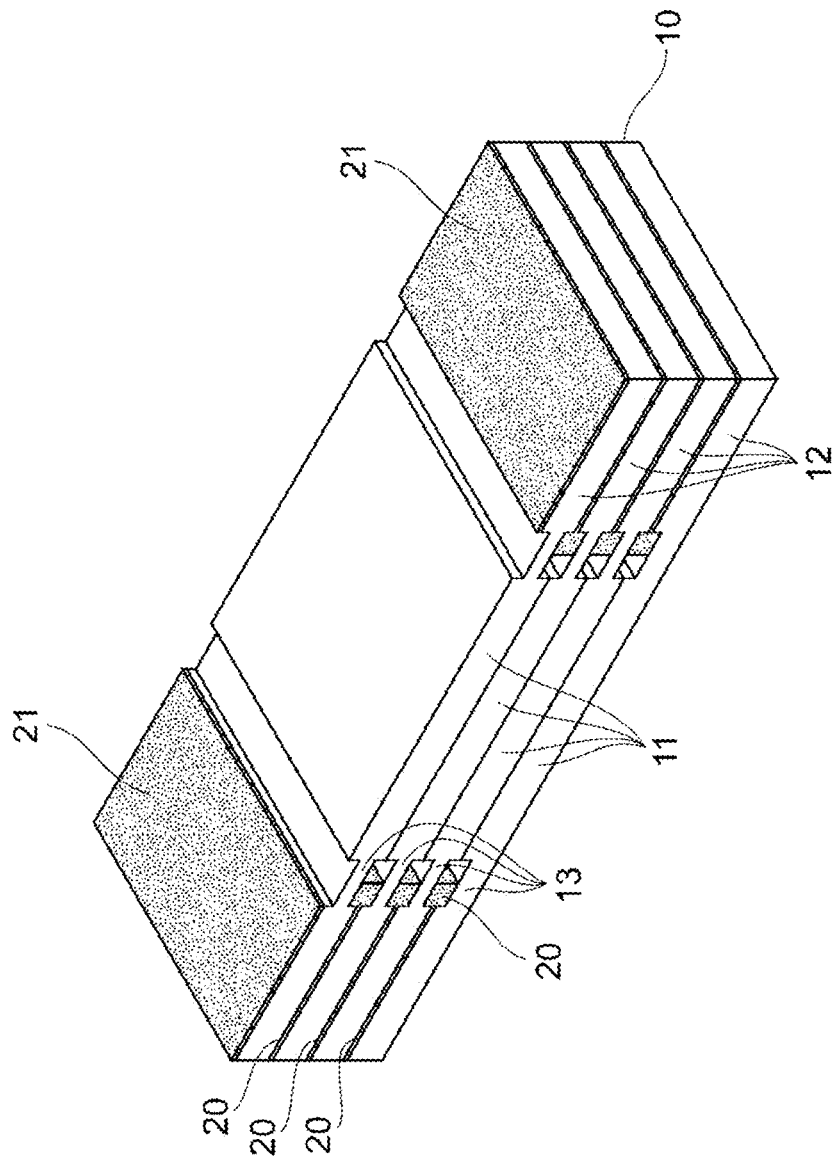
FIG. 8 is yet another schematic perspective view illustrating the method of manufacturing the wavelength conversion device according to the first embodiment.
Figure 9:
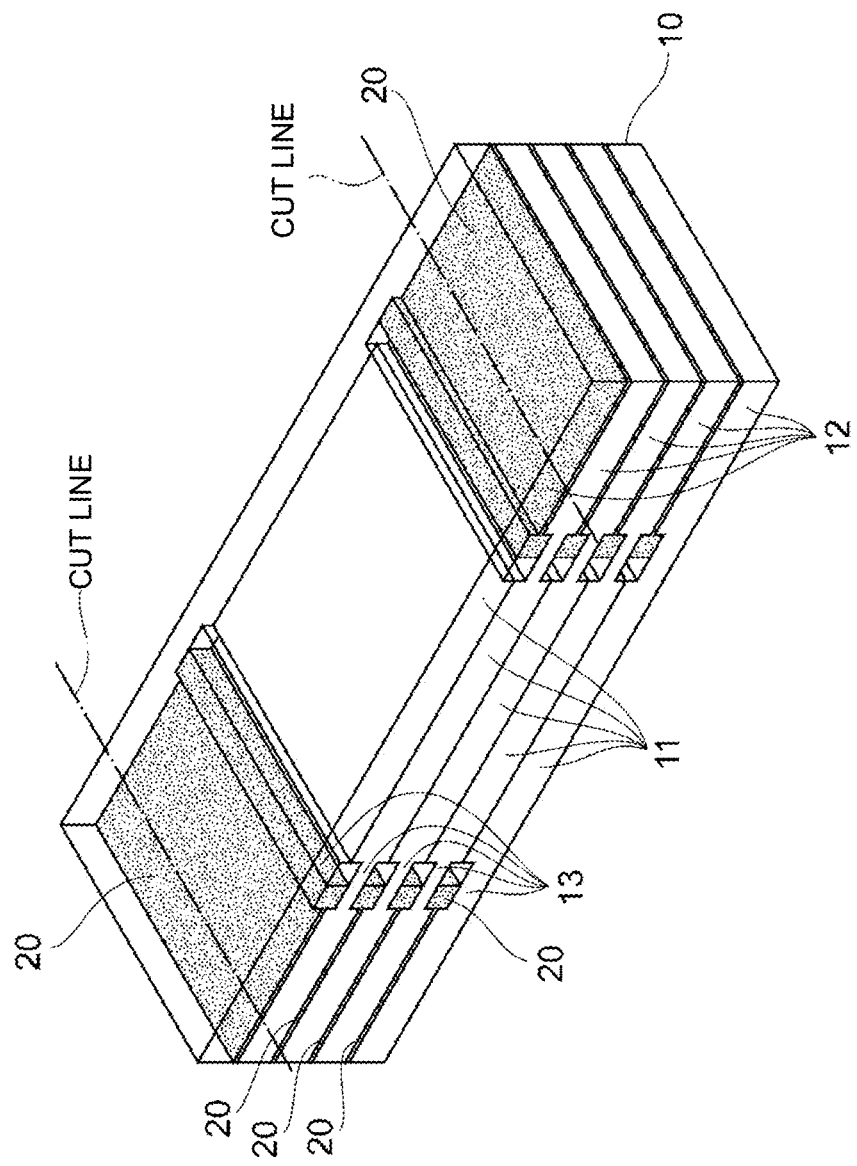
FIG. 9 is yet another schematic perspective view illustrating the method of manufacturing the wavelength conversion device according to the first embodiment.

If the wavelength conversion device to be manufactured has an N-layer structure, where N is a natural number, adhesive 21 is provided over part of or the entirety of each of the second-thickness portions 12 of an (N-1)th crystal layer 10 as illustrated in FIG. 8. Subsequently, as illustrated in FIG. 9, an Nth crystal layer 10 having a different crystal-axis orientation from the (N-1)th crystal layer 10 is placed on the (N-1)th crystal layer 10 on which the adhesive 21 has been provided. Then, the adhesive 21 is cured into an adhesive layer 20. The adhesive 21 may be cured every time a crystal layer 10 is placed or at a time after placing the Nth crystal layer 10. Subsequently, one or both of the two ends of the stack of crystal layers 10 may be cut off.

In the method of manufacturing the wavelength conversion device according to the first embodiment described above, no adhesive layer is present in the path of the incoming light to be subjected to wavelength conversion. Therefore, the incoming light to be subjected to wavelength conversion travels through part of the crystal layers 10 where the crystal layers 10 are substantially or completely in direct contact with one another. Hence, transmission losses in the incoming light and in the second harmonic wave are reduced. Furthermore, compared to the known method of artificially forming a twinned structure in the crystal by applying a stress, the method of manufacturing the wavelength conversion device according to the first embodiment realizes easier manufacturing of a wavelength conversion device having alternately inverted crystal-axis orientations.

Second Embodiment

In second and subsequent embodiments, description of elements that are the same as those of the first embodiment is omitted, and only differences from the first embodiment will be described. In particular, the same advantageous effects produced by the same elements are not mentioned for each of the embodiments.

Figure 10:
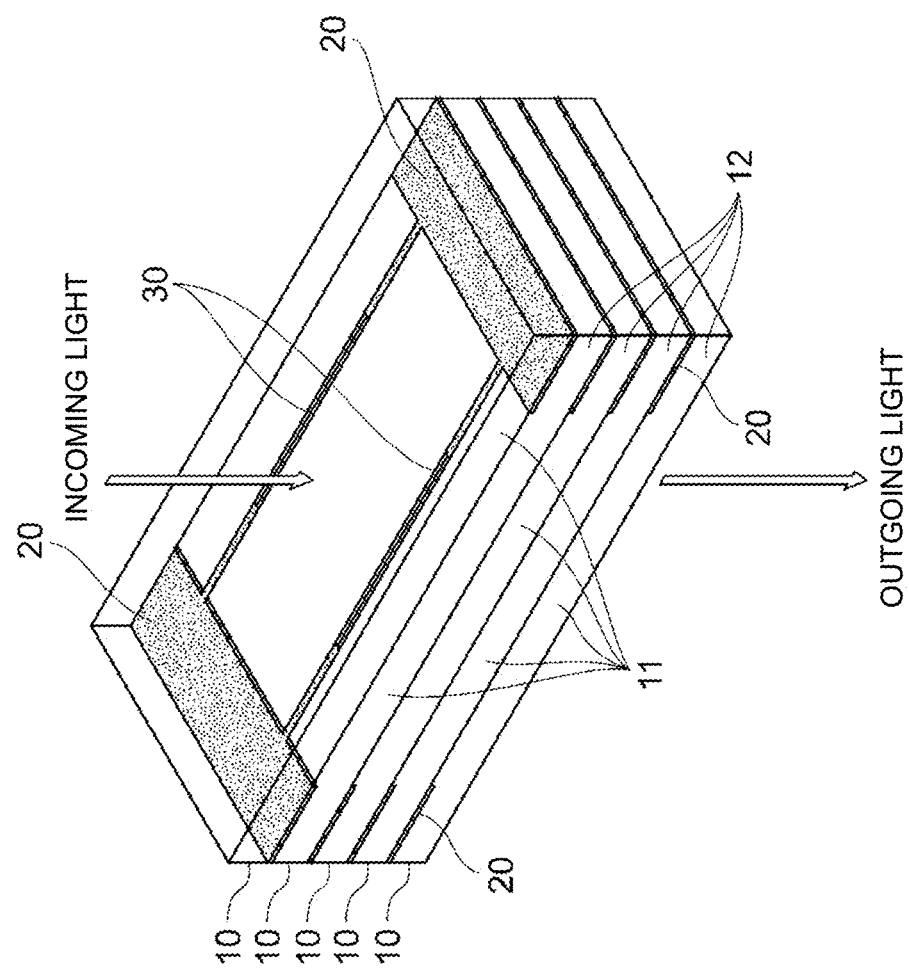
FIG. 10 is a schematic perspective view of a wavelength conversion device according to a second embodiment.
Figure 11:
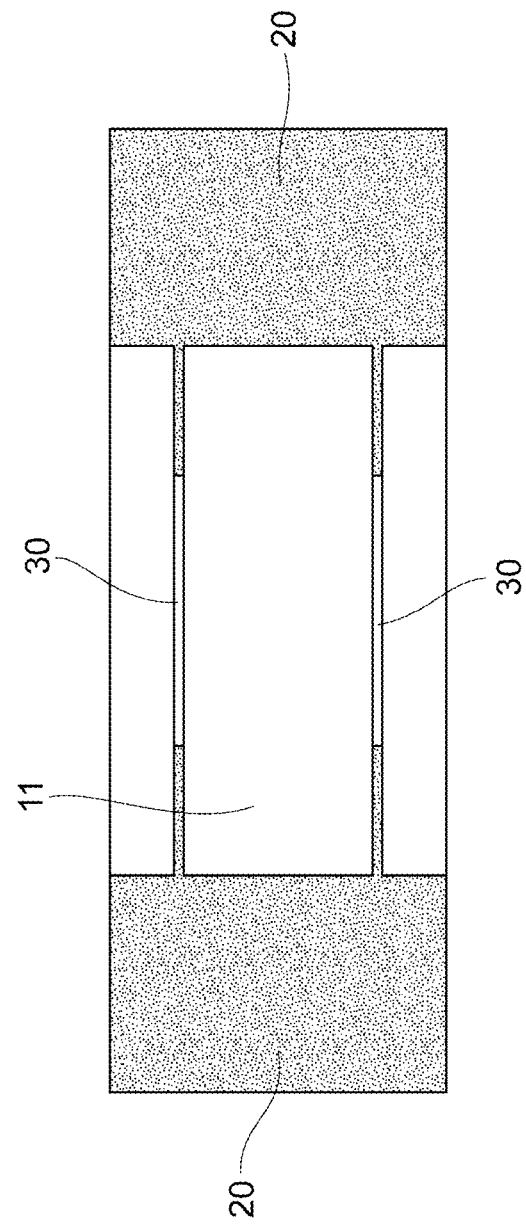
FIG. 11 is a schematic top view of the wavelength conversion device according to the second embodiment.

In a wavelength conversion device according to a second embodiment illustrated in FIGS. 10 and 11, the plurality of crystal layers 10 each have grooves 30 provided in the first-thickness portion 11. The grooves 30 are each continuous with spaces above the second-thickness portions 12 provided at the two respective ends of the first-thickness portion 11. For example, the bottom surface of each of the grooves 30 is flush with the upper surfaces of the second-thickness portions 12. In a region where the grooves 30 are absent, there is a level difference between the upper surface of each of the second-thickness portions 12 and the upper surface of the first-thickness portion 11. The adhesive layers 20 that bond the plurality of crystal layers 10 to one another may each further extend into at least part of the individual grooves 30. The incoming light to be subjected to wavelength conversion is made to be incident on the surface of the first-thickness portion 11 of the uppermost crystal layer 10 and in an area below which the grooves 30 are absent. The other elements of the wavelength conversion device according to the second embodiment are the same as those of the first embodiment.

Now, a method of manufacturing the wavelength conversion device according to the second embodiment will be described.

Figure 12:
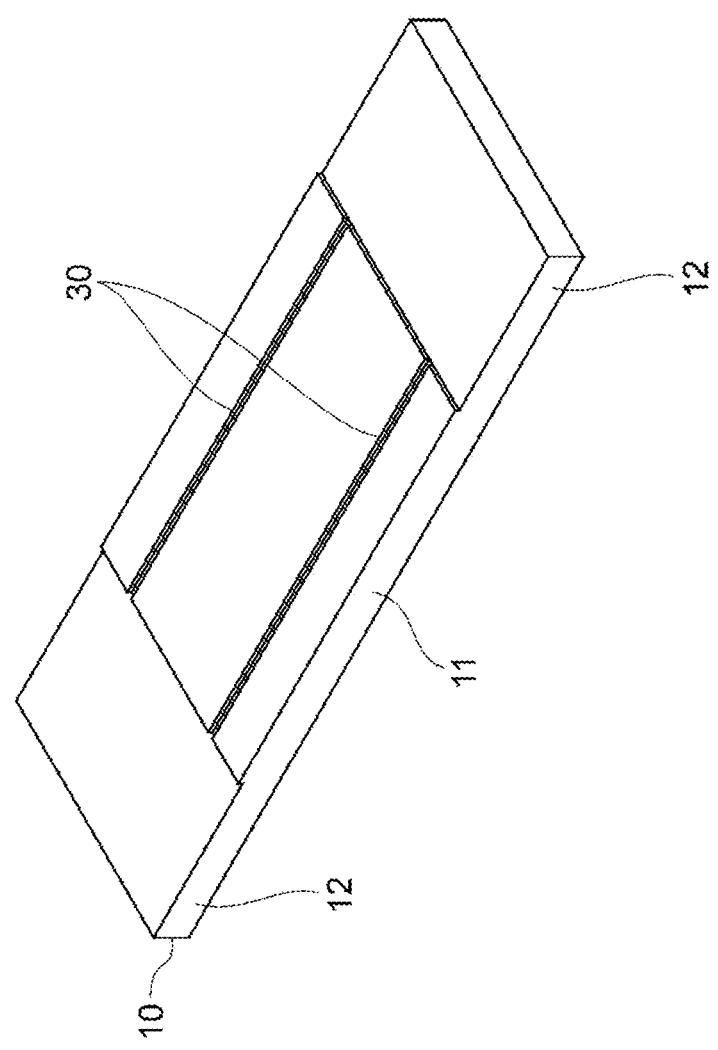
FIG. 12 is a schematic perspective view illustrating a method of manufacturing the wavelength conversion device according to the second embodiment.
Figure 13:
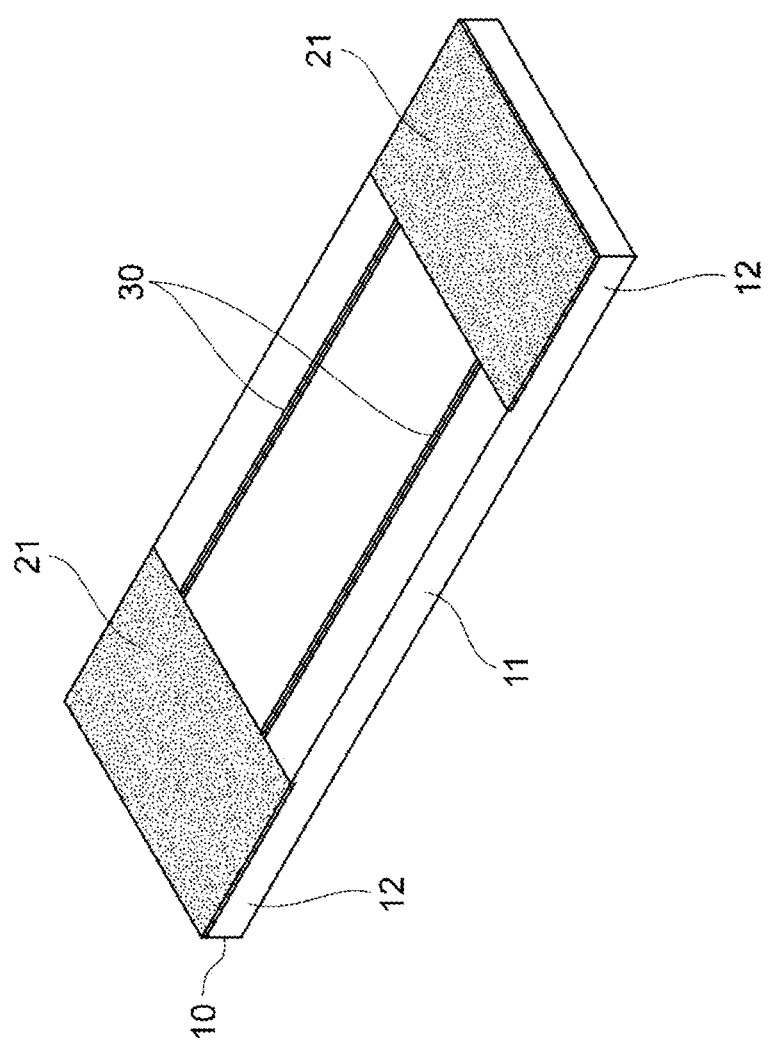
FIG. 13 is another schematic perspective view illustrating the method of manufacturing the wavelength conversion device according to the second embodiment.

As illustrated in FIG. 12, a first crystal layer 10 is prepared that includes second-thickness portions 12 at the two respective ends thereof and a first-thickness portion 11 between the second-thickness portions 12, with grooves 30 provided in the first-thickness portion 11 and each being continuous with spaces above the second-thickness portions 12 provided at the two respective ends of the first-thickness portion 11. As illustrated in FIG. 13, adhesive 21 is provided over part of or the entirety of each of the second-thickness portions 12 of the first crystal layer 10.

Figure 14:
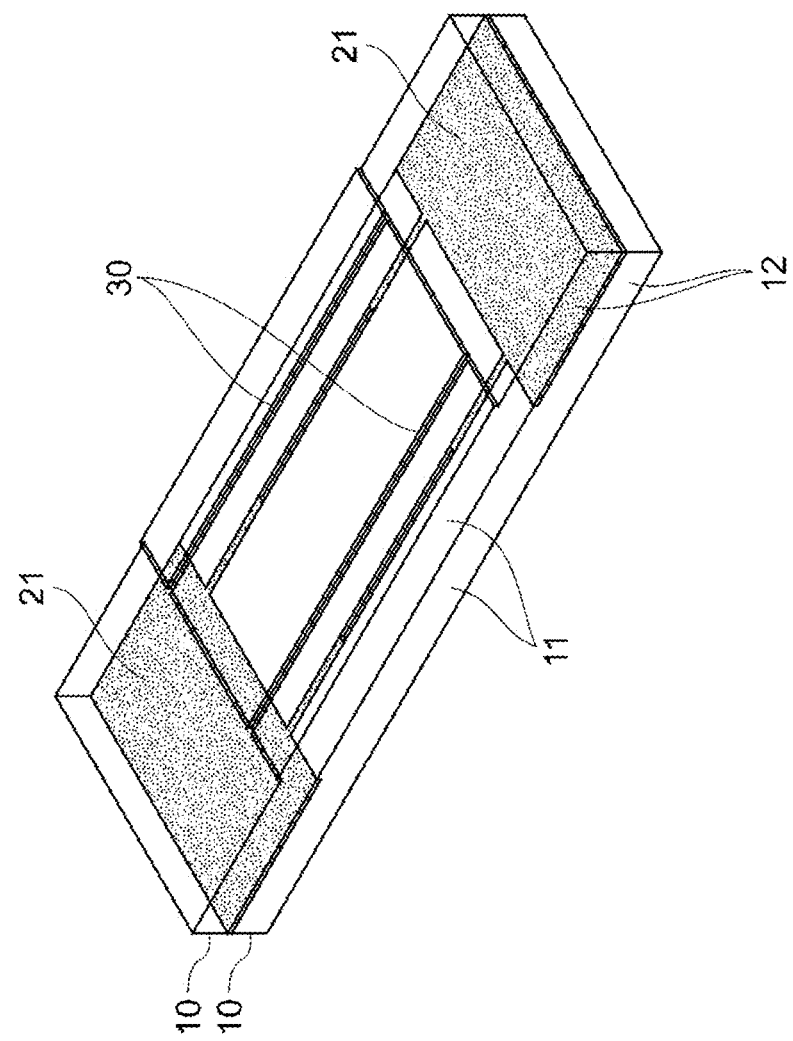
FIG. 14 is yet another schematic perspective view illustrating the method of manufacturing the wavelength conversion device according to the second embodiment.

As illustrated in FIG. 14, a second crystal layer 10 is placed on the first crystal layer 10 on which the adhesive 21 has been provided. The second crystal layer 10 has a different crystal-axis orientation from the first crystal layer 10. In this step, the adhesive 21 provided between the upper surface of each of the second-thickness portions 12 of the first crystal layer 10 and the lower surface of a corresponding one of the second-thickness portions 12 of the second crystal layer 10 is squeezed to spread into the grooves 30 provided in the first-thickness portion 11 of the first crystal layer 10. Since the grooves 30 each having a certain volume are provided, the adhesive 21 is prevented from spreading into a space between the upper surface of part of the first-thickness portion 11 of the first crystal layer 10 where the grooves 30 are absent and the lower surface of the first-thickness portion 11 of the second crystal layer 10. Therefore, the upper surface of part of the first-thickness portion 11 of the first crystal layer 10 where the grooves 30 are absent and the lower surface of the first-thickness portion 11 of the second crystal layer 10 are allowed to be substantially or completely in direct contact with each other.

Figure 15:
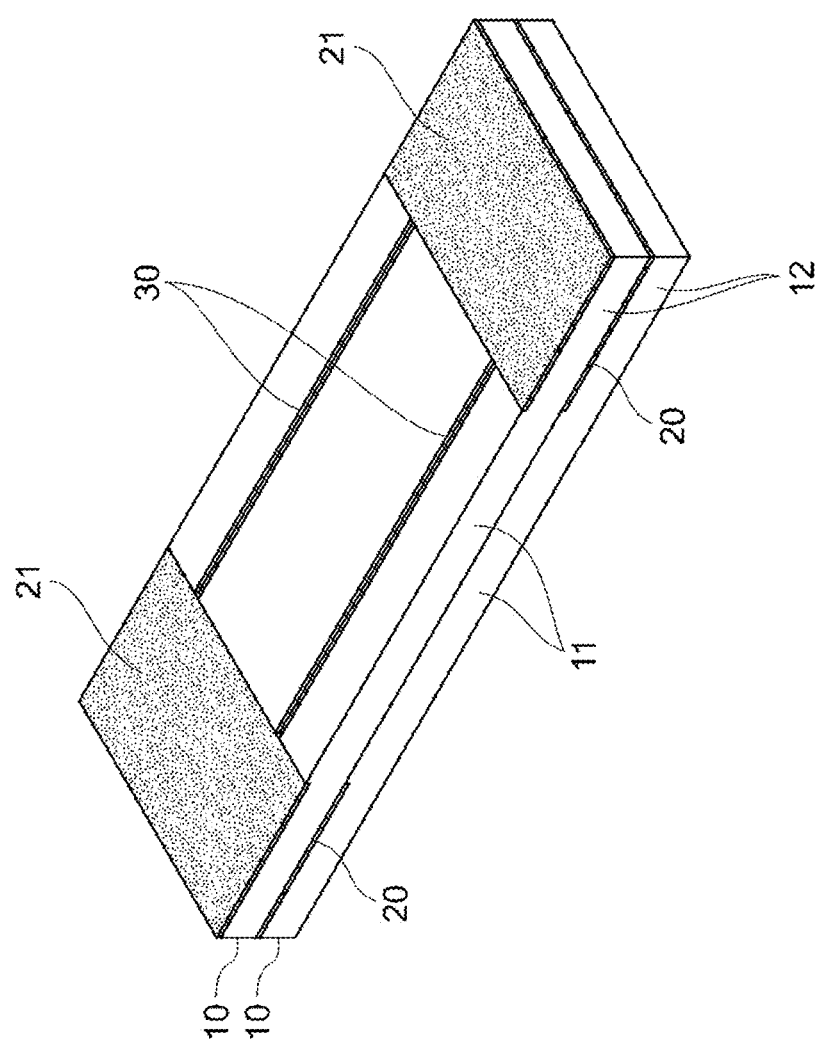
FIG. 15 is yet another schematic perspective view illustrating the method of manufacturing the wavelength conversion device according to the second embodiment.
Figure 16:
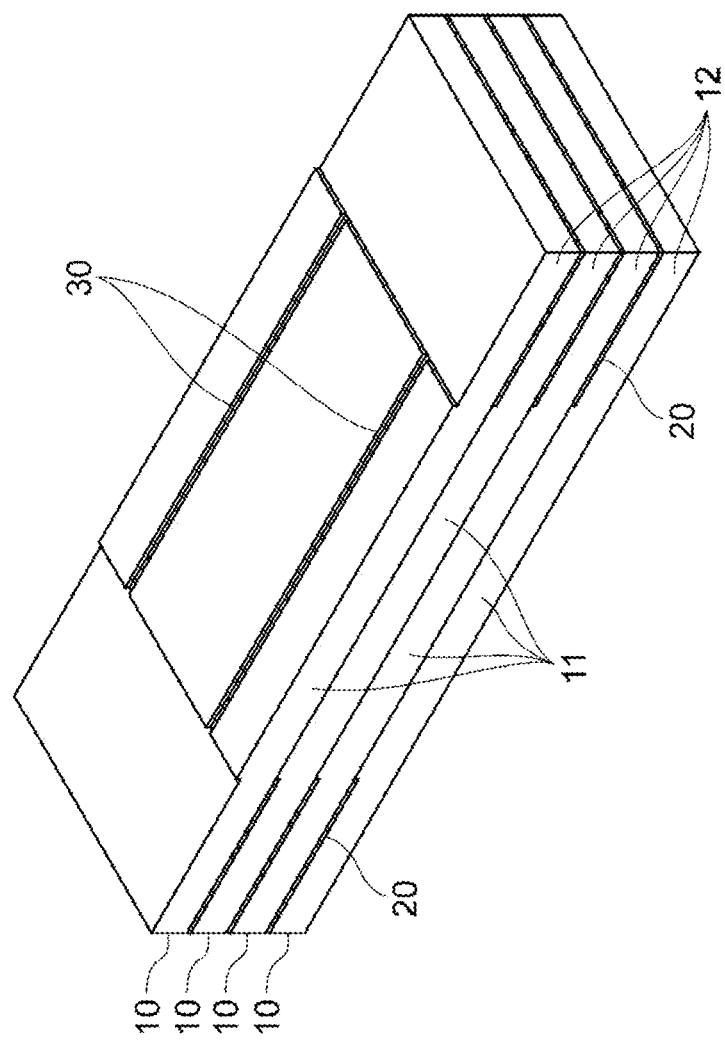
FIG. 16 is yet another schematic perspective view illustrating the method of manufacturing the wavelength conversion device according to the second embodiment.

Then, the adhesive 21 is cured into an adhesive layer 20, whereby the second crystal layer 10 is fixed to the first crystal layer 10. Subsequently, as illustrated in FIG. 15, adhesive 21 is provided over part of or the entirety of each of the second-thickness portions 12 of the second crystal layer 10. Then, as illustrated in FIG. 16, a third and subsequent crystal layers 10 are sequentially bonded to the preceding crystal layer 10 such that the crystal-axis orientations thereof are alternately changed.

Figure 17:
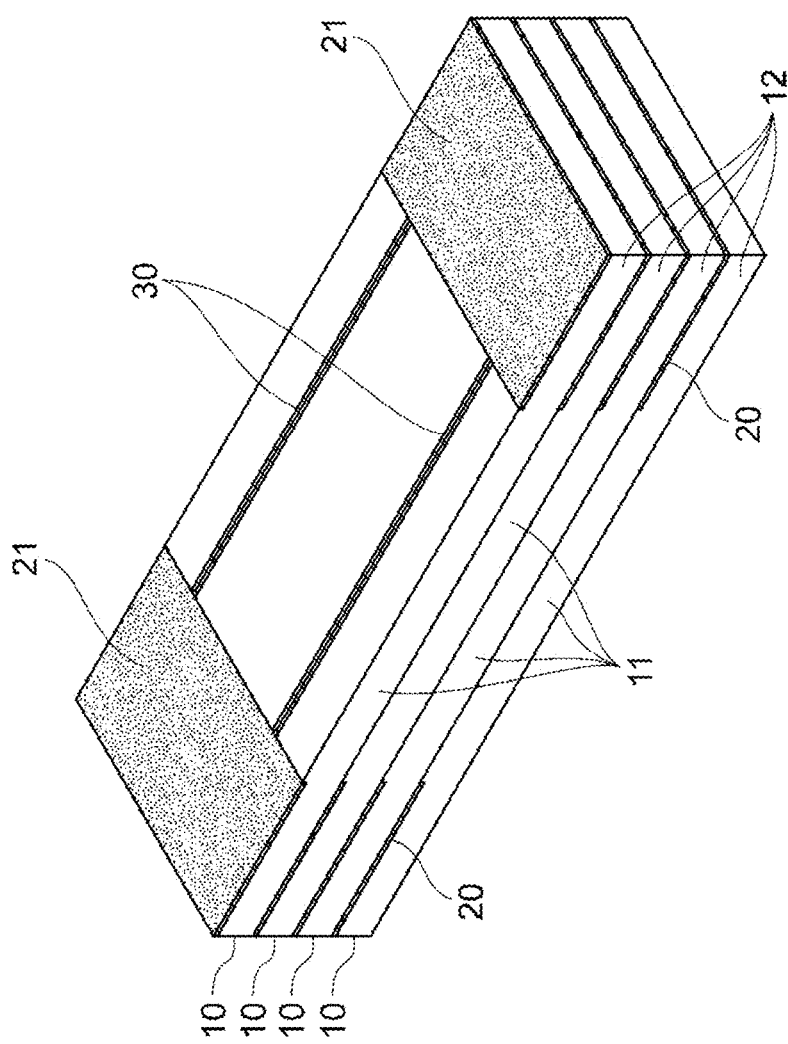
FIG. 17 is yet another schematic perspective view illustrating the method of manufacturing the wavelength conversion device according to the second embodiment.
Figure 18:
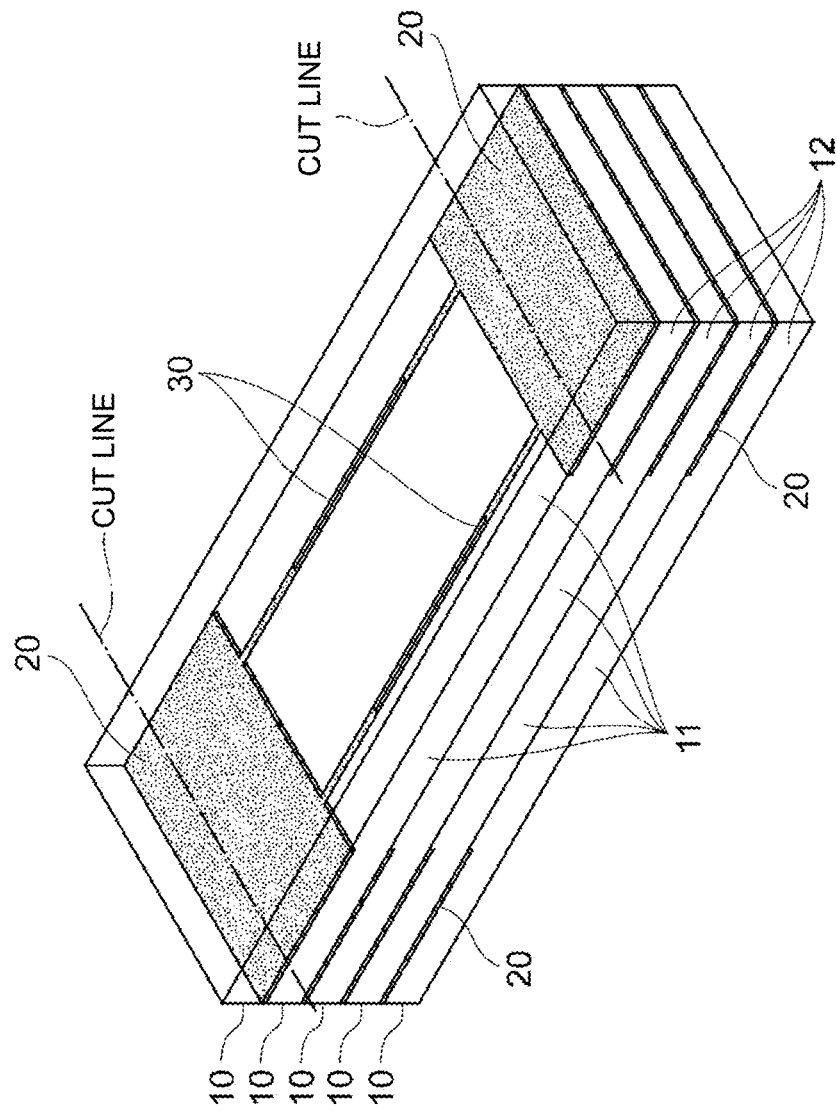
FIG. 18 is yet another schematic perspective view illustrating the method of manufacturing the wavelength conversion device according to the second embodiment.

If the wavelength conversion device to be manufactured has an N-layer structure, where N is a natural number, adhesive 21 is provided over part of or the entirety of each of the second-thickness portions 12 of an (N-1)th crystal layer 10 as illustrated in FIG. 17. Subsequently, as illustrated in FIG. 18, an Nth crystal layer 10 having a different crystal-axis orientation from the (N-1)th crystal layer 10 is placed on the (N-1)th crystal layer 10 on which the adhesive 21 has been provided. Then, the adhesive 21 is cured into an adhesive layer 20. The adhesive 21 may be cured every time a crystal layer 10 is placed or at a time after placing the Nth crystal layer 10. Subsequently, one or both of the two ends of the stack of crystal layers 10 may be cut off.

Third Embodiment

Figure 19:
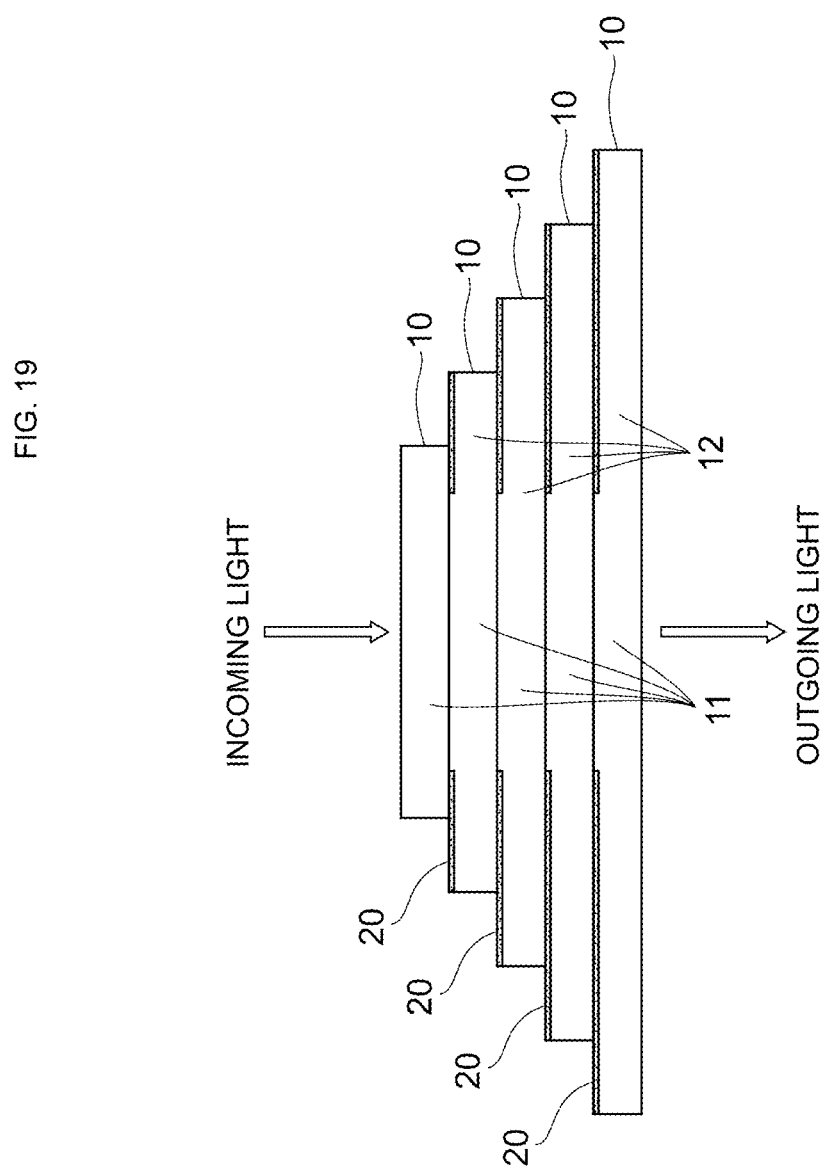
FIG. 19 is a schematic side view of a wavelength conversion device according to a third embodiment.
Figure 20:
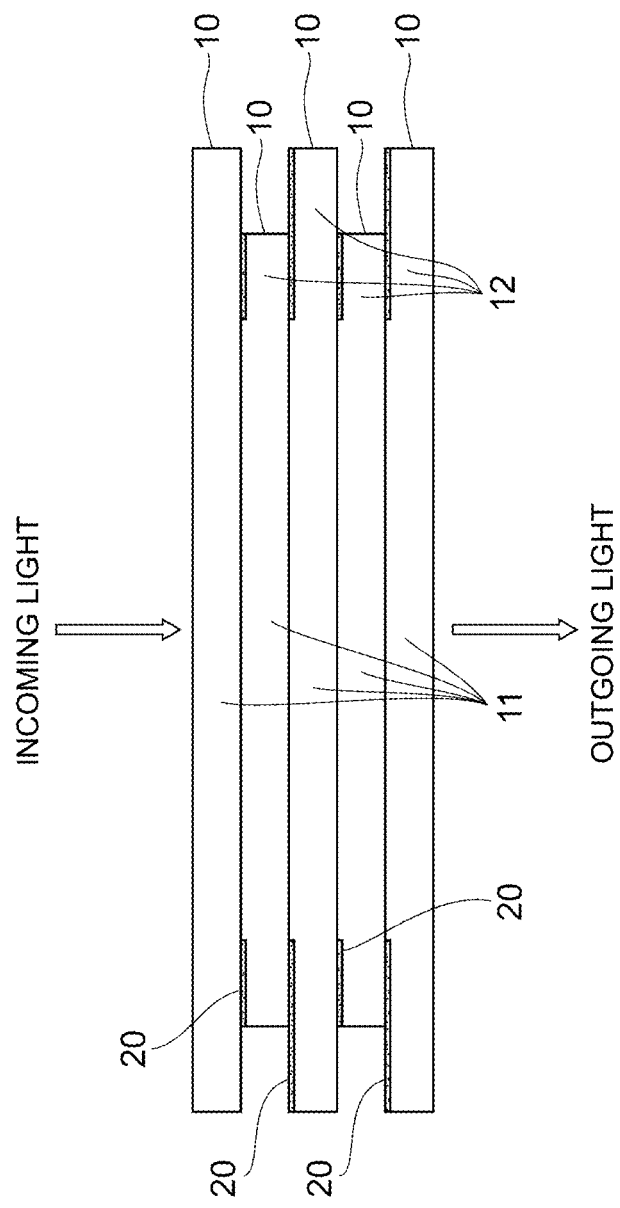
FIG. 20 is a schematic side view of another wavelength conversion device according to the third embodiment.

Wavelength conversion devices according to a third embodiment illustrated in FIGS. 19 and 20 each include a plurality of crystal layers 10 having different widths. In each of the wavelength conversion devices according to the third embodiment, the plurality of crystal layers 10 each include the second-thickness portion 12 at one end or at each of the two ends. FIG. 19 illustrates an example where the widths of the plurality of crystal layers 10 gradually decrease. In the example illustrated in FIG. 19, the crystal layer 10 at the extreme end on the emission side has the largest width, and the widths of the crystal layers 10 gradually decrease toward the incidence side. Alternatively, the crystal layer 10 at the extreme end on the incidence side may have the largest width, and the widths of the crystal layers 10 may gradually decrease toward the emission side. FIG. 20 illustrates an example where the widths of the plurality of crystal layers 10 alternately increase and decrease.

The wavelength conversion devices according to the third embodiment are each manufactured by providing adhesive over the second-thickness portion 12 of each of the crystal layers 10 and bonding the crystal layers 10 one on top of another. In this process, the adhesive 21 provided between the upper surface of the second-thickness portion 12 of the lower crystal layer 10 and the lower surface of the second-thickness portion 12 of the upper crystal layer 10 is squeezed to spread over side faces of the crystal layers 10. Furthermore, since there is a level difference between the upper surface of the second-thickness portion 12 and the upper surface of the first-thickness portion 11, the adhesive is prevented from flowing into a space between the upper surface of the first-thickness portion 11 of the lower crystal layer 10 and the lower surface of the first-thickness portion 11 of the upper crystal layer 10. Therefore, the upper surface of the first-thickness portion 11 of the first crystal layer 10 and the lower surface of the first-thickness portion 11 of the second crystal layer 10 are allowed to be substantially or completely in direct contact with each other. Note that after the above structure is obtained, end portions of the structure may be cut off so that the plurality of crystal layers 10 all have the same width.

As described above, the wavelength conversion devices according to the respective embodiments of the present invention each involve any of the following configurations based on one of or a combination of some of the features described above and produce corresponding advantageous effects.

A wavelength conversion device according to an embodiment includes a plurality of crystal layers 10 bonded to one another such that crystal-axis orientations thereof are alternately changed, the plurality of crystal layers 10 each including a first-thickness portion 11 having a first thickness and a second-thickness portion 12 having a second thickness smaller than the first thickness; and an adhesive layer 20 in at least part of a gap between adjacent second-thickness portions of the second-thickness portions 12 of the plurality of crystal layers 10 and with which the plurality of crystal layers 10 are bonded to one another.

The wavelength conversion device according to the above embodiment can be manufactured without applying a stress to the crystal and is therefore easy to manufacture.

In the above wavelength conversion device, the adhesive layer 20 may be absent between adjacent first-thickness portions of the first-thickness portions 11 of the plurality of crystal layers 10.

In such a configuration, transmission losses in the incoming light and in the second harmonic wave can be reduced.

In the above wavelength conversion device, the plurality of crystal layers 10 may each include the second-thickness portion 12 at each of the two ends of the first-thickness portion 11.

In such a configuration, the force of fixing the plurality of crystal layers 10 to one another with the adhesive layers 20 can be increased.

In the above wavelength conversion device, the plurality of crystal layers 10 may each further include a third-thickness portion 13 having a third thickness smaller than the second thickness and provided between the first-thickness portion 11 and the second-thickness portion 12. Furthermore, the adhesive layers 20 may each further extend over at least part of the third-thickness portion. Furthermore, the plurality of crystal layers 10 may each have a groove defined by the first-thickness portion 11, the second-thickness portion 12, and the third-thickness portion 13, with the upper surface of the third-thickness portion 13 forming the bottom surface of the groove.

In such a configuration, the level difference at the third-thickness portion 13 can make the adhesive 21 less likely to spread over the first-thickness portion 11 in the process of manufacturing the wavelength conversion device.

In the above wavelength conversion device, the plurality of crystal layers 10 may each have a groove 30 provided in the first-thickness portion 11 and being continuous with a space above the second-thickness portion 12. Alternatively, the plurality of crystal layers 10 may each have a groove 30 provided in the first-thickness portion 11 and being continuous with spaces above the second-thickness portions 12 provided at the two respective ends of the first-thickness portion 11. In either case, the adhesive layer 20 may further extend into at least part of the groove 30. Alternatively, the second-thickness portion 12 of each of the plurality of crystal layers 10 may surround the first-thickness portion 11.

In such a configuration, the level difference at the groove 30 or at the second-thickness portion 12 can make the adhesive 21 less likely to spread over the first-thickness portion 11 in the process of manufacturing the wavelength conversion device.

In the above wavelength conversion device, the plurality of crystal layers 10 may have different widths. In such a case, the widths of the plurality of crystal layers 10 may gradually decrease or alternately increase and decrease. Furthermore, the second-thickness portion 12 may be positioned at an end portion of each of the plurality of crystal layers 10.

In such a configuration, the adhesive 21 can be made less likely to spread to the outside of the second-thickness portion 12 and over the first-thickness portion 11 in the process of manufacturing the wavelength conversion device.

In the above wavelength conversion device, the first-thickness portions 11 of the plurality of crystal layers 10 may be in direct contact with one another.

In such a configuration, transmission losses in the incoming light and in the second harmonic wave can be reduced.

In the above wavelength conversion device, the plurality of crystal layers 10 may be bonded to one another such that the crystal-axis orientations thereof are alternately inverted.

In such a configuration, the second harmonic wave can exhibit a satisfactory level of intensity.

In the above wavelength conversion device, the incoming light to be subjected to wavelength conversion may be made to be incident on the first-thickness portions of the plurality of crystal layers.

In such a configuration, transmission losses in the incoming light and in the second harmonic wave can be reduced.

As described above, the methods of manufacturing the wavelength conversion devices according to the respective embodiments of the present invention each involve any of the following configurations based on one of or a combination of some of the features described above and produce corresponding advantageous effects.

A method of manufacturing a wavelength conversion device according to an embodiment includes providing a plurality of crystal layers 10 each including a first-thickness portion 11 having a first thickness, a second-thickness portion 12 having a second thickness smaller than the first thickness, and a crystal-axis orientation; placing adhesive 21 over at least part of the second-thickness portion 12 of a first crystal layer of the plurality of crystal layers 10; placing a second crystal layer of the plurality of crystal layers adjacent the first crystal layer such that the respective first-thickness portions and the second-thickness portions of the first and second crystal layers are adjacent each other and the crystal-axis orientations of the first and second crystal layers are alternately arranged; and bonding the plurality of crystal layers 10 to one another with the adhesive 21.

In such a method, the wavelength conversion device can be manufactured without applying a stress to the crystal.

In the above method of manufacturing a wavelength conversion device, when the plurality of crystal layers 10 are bonded to one another, the adhesive 21 provided over the at least part of the second-thickness portion 12 may be prevented from spreading over the first-thickness portion 11.

In such a method, transmission losses in the incoming light and in the second harmonic wave that may occur in the thus manufactured wavelength conversion device can be reduced.

In the above method of manufacturing a wavelength conversion device, the plurality of crystal layers 10 may each include the second-thickness portion 12 at each of the two ends of the first-thickness portion 11.

In such a method, the force of fixing the plurality of crystal layers 10 to one another with the adhesive 21 can be increased.

In the above method of manufacturing a wavelength conversion device, the plurality of crystal layers 10 may each further include a third-thickness portion 13 having a third thickness smaller than the second thickness and provided between the first-thickness portion 11 and the second-thickness portion 12. Furthermore, when the plurality of crystal layers 10 are bonded to one another, the adhesive 21 provided over the at least part of the second-thickness portion 12 may spread over at least part of the third-thickness portion 13. Furthermore, the plurality of crystal layers 10 may each have a groove defined by the first-thickness portion 11, the second-thickness portion 12, and the third-thickness portion 13, with the upper surface of the third-thickness portion 13 forming the bottom surface of the groove.

In such a method, the level difference at the third-thickness portion 13 can make the adhesive 21 less likely to spread over the first-thickness portion 11.

In the above method of manufacturing a wavelength conversion device, the plurality of crystal layers 10 may each have a groove 30 provided in the first-thickness portion 11 and being continuous with a space above the second-thickness portion 12. Alternatively, the plurality of crystal layers 10 may each have a groove 30 provided in the first-thickness portion 11 and being continuous with spaces above the second-thickness portions 12 provided at the two respective ends of the first-thickness portion 11. In either case, when the plurality of crystal layers 10 are bonded to one another, the adhesive 21 provided over the at least part of the second-thickness portion 12 may spread into at least part of the groove 30. Alternatively, the second-thickness portion 12 of each of the plurality of crystal layers 10 may surround the first-thickness portion 11.

In such a method, the level difference at the groove 30 or at the second-thickness portion 12 can make the adhesive 21 less likely to spread over the first-thickness portion 11.

In the above method of manufacturing a wavelength conversion device, the plurality of crystal layers 10 may have different widths. In such a case, the widths of the plurality of crystal layers 10 may gradually decrease or alternately increase and decrease. Furthermore, the second-thickness portion 12 may be positioned at an end portion of each of the plurality of crystal layers 10.

In such a method, the adhesive 21 can be made less likely to spread to the outside of the second-thickness portion 12 and over the first-thickness portion 11.

In the above method of manufacturing a wavelength conversion device, the first-thickness portions 11 of the plurality of crystal layers 10 may be in direct contact with one another.

In such a method, transmission losses in the incoming light and in the second harmonic wave that may occur in the thus manufactured wavelength conversion device can be reduced.

In the above method of manufacturing a wavelength conversion device, the plurality of crystal layers 10 may be bonded to one another such that the crystal-axis orientations thereof are alternately inverted.

In such a method, the second harmonic wave generated by the thus manufactured wavelength conversion device can exhibit a satisfactory level of intensity.

The embodiments described above are provided for easy understanding of the present invention and are not intended for limited interpretation of the present invention. The present invention can be modified or improved without departing from the essence thereof and includes equivalents thereof. That is, embodiments obtained with any design changes made to the above embodiments by those skilled in the art are included in the scope of the present invention, as long as such embodiments include the features of the present invention. For example, the individual elements employed in the embodiments and their positions, materials, conditions, shapes, sizes, and other factors are not limited to those described in the above embodiments, and various changes can be made thereto according to need. Moreover, needless to say, the above embodiments are only exemplary, and any of the features of different embodiments may be interchanged or combined. Embodiments obtained through such interchanges or combinations are also included in the scope of the present invention, as long as such embodiments include the features of the present invention.

REFERENCE SIGNS LIST 10 crystal layer
11 first-thickness portion
12 second-thickness portion
13 third-thickness portion
20 adhesive layer
21 adhesive
30 groove

The invention claimed is:

1. A wavelength conversion device comprising:
a plurality of crystal layers adjacent to one another such that crystal-axis orientations of the crystal layers alternate between adjacent crystal layers, the plurality of crystal layers each including a first-thickness portion having a first thickness and a second-thickness portion having a second thickness smaller than the first thickness; and
an adhesive layer in at least part of a gap between adjacent second-thickness portions of the second-thickness portions of the plurality of crystal layers and with which the plurality of crystal layers are bonded to one another, wherein the first thickness portions are in direct contact with each other in a thickness direction of the plurality of crystal layers.

2. The wavelength conversion device according to claim 1, wherein the adhesive layer is absent between adjacent first-thickness portions of the first-thickness portions of the plurality of crystal layers.

3. The wavelength conversion device according to claim 1, wherein the plurality of crystal layers each include the second-thickness portion at each of two opposed ends of the first-thickness portion.

4. The wavelength conversion device according to claim 1, wherein the plurality of crystal layers each further include a third-thickness portion having a third thickness smaller than the second thickness and provided between the first-thickness portion and the second-thickness portion.

5. The wavelength conversion device according to claim 4, wherein the adhesive layer extends over at least part of the third-thickness portion.

6. The wavelength conversion device according to claim 4, wherein the plurality of crystal layers each have a groove defined by the first-thickness portion, the second-thickness portion, and the third-thickness portion, wherein an upper surface of the third-thickness portion is a bottom surface of the groove.

7. The wavelength conversion device according to claim 1, wherein the plurality of crystal layers each have a groove in the first-thickness portion, the groove being continuous with a space above the second-thickness portion.

8. The wavelength conversion device according to claim 3, wherein the plurality of crystal layers each have a groove in the first-thickness portion, the groove being continuous with spaces above the second-thickness portions provided at the two respective opposed ends of the first-thickness portion.

9. The wavelength conversion device according to claim 7, wherein the adhesive layer extends into at least part of the groove.

10. The wavelength conversion device according to claim 1, wherein the plurality of crystal layers have different widths.

11. The wavelength conversion device according to claim 1, wherein widths of the plurality of crystal layers decrease from a first surface of the wavelength conversion device toward a second surface of the wavelength conversion device opposite the first surface.

12. The wavelength conversion device according to claim 1, wherein widths of the plurality of crystal layers alternately increase and decrease from a first surface of the wavelength conversion device toward a second surface of the wavelength conversion device opposite the first surface.

13. The wavelength conversion device according to claim 1, wherein the second-thickness portion is at an end portion of each of the plurality of crystal layers.

14. The wavelength conversion device according to claim 1, wherein the crystal-axis orientations of the adjacent crystal layers are alternately inverted.

15. A method of manufacturing a wavelength conversion device, the method comprising:
provliding a plurality of crystal layers each including a first-thickness portion having a first thickness, a second-thickness portion having a second thickness smaller than the first thickness, and a crystal-axis orientation;
placing adhesive over at least part of the second-thickness portion of a first crystal layer of the plurality of crystal layers;
placing a second crystal layer of the plurality of crystal layers adjacent the first crystal layer such that the respective first-thickness portions and the second-thickness portions of the first and second crystal layers are adjacent each other, the crystal-axis orientations of the first and second crystal layers are alternately arranged, and the respective first thickness portions of the first and second crystal layers are in direct contact with each other in a thickness direction of the plurality of crystal layers; and
bonding the plurality of crystal layers to one another with the adhesive.

16. The method of manufacturing a wavelength conversion device according to claim 15, wherein the plurality of crystal layers each further include a third-thickness portion having a third thickness smaller than the second thickness and provided between the first-thickness portion and the second-thickness portion.

17. The method of manufacturing a wavelength conversion device according to claim 16, wherein when the first and second adjacent crystal layers are bonded to one another, the adhesive placed over the at least part of the second-thickness portion of the first crystal layer spreads over at least part of the third-thickness portion.

18. The method of manufacturing a wavelength conversion device according to claim 15, wherein the plurality of crystal layers each have a groove provided in the first-thickness portion and being continuous with a space above the second-thickness portion.

19. The method of manufacturing a wavelength conversion device according to claim 18, wherein when the first and second adjacent crystal layers are bonded to one another, the adhesive placed over the at least part of the second-thickness portion of the first crystal layer spreads into at least part of the groove.

* * * * *